J. F. Heissenbuttel,
Rolling Pin.
N° 39,916. Patented Sep. 15, 1863.
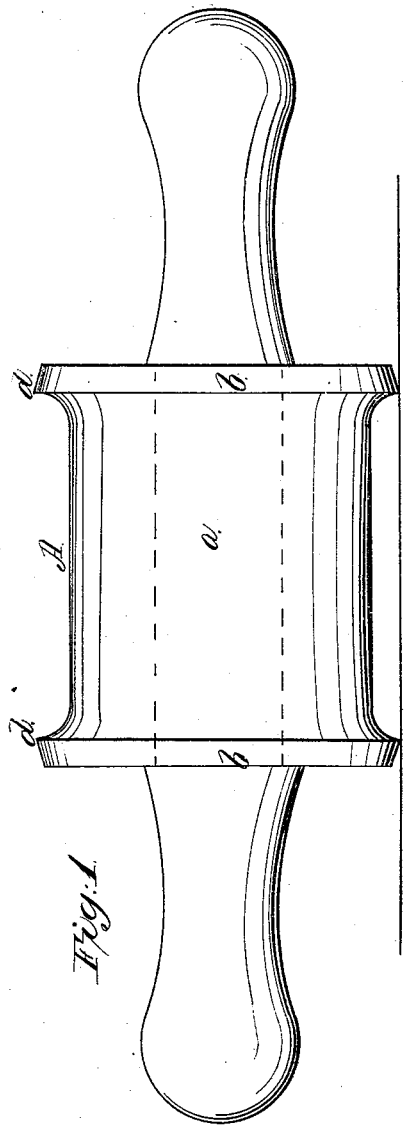
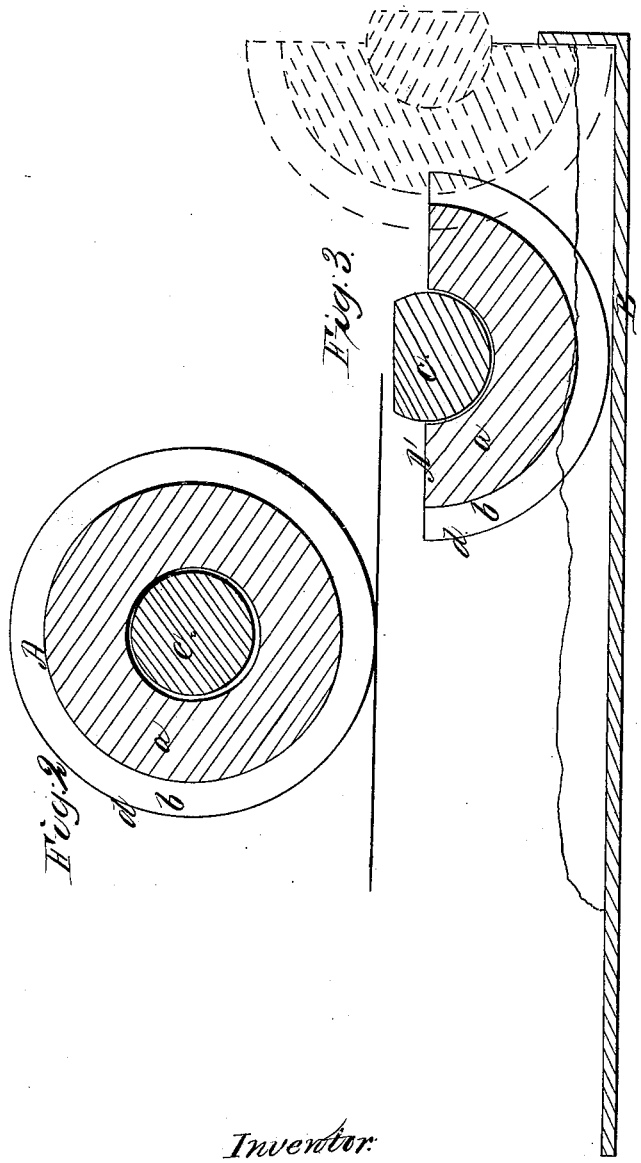
Witnesses:
Jw Coombs.
G W Reid.
Inventor:
John F. Heissenbuttel
per Munn & Co.
Attorneys.

United States Patent Office.

JOHN FREDRICK HEISSENBUTTEL, OF BROOKLYN, NEW YORK.

IMPROVED ROLLING-PIN.

Specification forming part of Letters Patent No. 39,916, dated September 15, 1863.

*To all whom it may concern:*

Be it known that I, JOHN F. HEISSENBUTTEL, of Brooklyn, in the county of Kings and State of New York, have invented a new and Improved Hand Rolling-Pin; and I do hereby declare that the following is a full, clear, and exact description of the same, reference being had to the accompanying drawings, forming a part of this specification, in which—

Figure 1 represents a front elevation of my invention. Fig. 2 is a transverse vertical section of the same. Fig. 3 is a similar section of the semi-cylindrical roller, which I use at certain stages of the operation.

Similar letters of reference in the three views indicate corresponding parts.

This invention relates to a rolling-pin intended to be used particularly for rolling out dough for that kind of cake or biscuit known by the name of "zwieback," and extensively sold in the United States among the German and American population. The dough for the zwieback is made of flour, sugar, and butter, with sufficient water and baker's yeast to produce fermentation and lightness, and it is formed in long thin loaves and baked, and afterward, when the loaves have cooled off, it is cut in slices and rebaked or toasted until entirely dry.

In order to facilitate the operation of forming the loaves, I use my rolling-pin A, which consists of a cylinder, $a$, with flanges $b$, one at each end, and a handle, $c$. The flanges $b$ of the finishing-pin ought to be made of metal and screwed to the ends of the wooden cylinder $a$, and the handle is placed loosely through the center of the cylinder, so that the latter can turn freely on the same, or the handle may be firmly secured to the cylinder, and in this case it must be permitted to turn in the hands as the cylinder rolls along.

For the purpose of forming and compressing the dough on the bench, a roller with wooden flanges can be used. Both pins—that one used on the bench and that one used on the pan—are provided with flanges, the only difference being that the flanges of the first pin or roller are a little higher than those of the second or finishing pin and need not necessarily be sharp-edged.

To form a loaf I take a sufficient quantity, rather more than enough for one loaf, and form it on the bench in a loaf about four times as long as it is wide, and by passing the flanged roller over it the dough is compressed and formed into a continuous strip of uniform thickness and width. The loaf thus formed by the action of the first roller is then taken up carefully and placed on the pan B, (see Fig. 3,) and on this plan it is exposed to the action of the finishing-pin. The flanges of this pin are provided with a sharp edge, $d$, as clearly shown in Fig. 1 of the drawings, and the corners are rounded to prevent the dough from adhering to them. In order to start close in the corner of the pan, a semi-cylindrical pin, A', is first used, and the ful pin is appl ed just where the first pin has left off. The flanges of the finishing pins are equal in height to the required thickness of the loaves, and by the sharp edges of these flanges all dough projecting over in a lateral direction is cut off, and the loaf is formed and compressed to a uniform thickness from end to end. That portion of the dough which is forced lengthwise over the open end of the pan is cut off with a cutter, and the loaf is ready for baking. Two or more loaves are thus formed on the same pan, side by side, and placed in the oven without taking them off from the pan, the dough being too soft to permit of handling the loaves without spoiling their uniform shape. The loaves must be evenly made to allow of baking and toasting them properly and to produce a uniform and marketable article which can be sold by count or weight.

Having thus described my invention, I claim as new and desire to secure by Letters Patent as an improved article of manufacture—

A rolling-pin made with flanges $b$, in the manner and for the purpose herein shown and described.

JOHN FREDRICK HEISSENBUTTEL.

Witnesses:
   ANDREW J. TODD,
   M. S. PARTRIDGE.